US009317216B1

(12) United States Patent
O'Brien et al.

(10) Patent No.: US 9,317,216 B1
(45) Date of Patent: Apr. 19, 2016

(54) SMR AUTO-TIERING

(71) Applicant: EMC Corporation, Hopkinton, MA (US)

(72) Inventors: Walter A. O'Brien, Westborough, MA (US); Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 167 days.

(21) Appl. No.: 14/137,559

(22) Filed: Dec. 20, 2013

(51) Int. Cl.
*G06F 3/06* (2006.01)

(52) U.S. Cl.
CPC .............. *G06F 3/065* (2013.01); *G06F 3/0614* (2013.01); *G06F 3/0689* (2013.01)

(58) Field of Classification Search
CPC ...... G06F 3/065; G06F 3/0614; G06F 3/0689
See application file for complete search history.

(56) References Cited

U.S. PATENT DOCUMENTS

| 2011/0010514 A1* | 1/2011 | Benhase et al. ............... 711/162 |
| 2014/0046908 A1* | 2/2014 | Patiejunas et al. ........... 707/687 |
| 2014/0115238 A1* | 4/2014 | Xi et al. ....................... 711/103 |

* cited by examiner

*Primary Examiner* — Edward Dudek, Jr.
(74) *Attorney, Agent, or Firm* — Brian J. Colandreo; Mark H. Whittenberger; Holland & Knight LLP

(57) ABSTRACT

A method, computer program product, and computing system for initiating a relocation process to move local data from an SMR-based storage tier within an auto-tiering data system to a different storage tier within the auto-tiering data system. The local data is located within one or more sectors of the SMR-based storage tier. The local data is copied from the SMR-based storage tier to the different storage tier. The one or more sectors of the SMR-based storage tier are unmapped.

20 Claims, 4 Drawing Sheets

10

SMR AUTO-TIERING

TECHNICAL FIELD

This disclosure relates to auto-tiering data systems and, more particularly, to auto-tiering data systems that utilize SMR-based disk drives.

BACKGROUND

Storing and safeguarding electronic content is of paramount importance in modern business. Accordingly, large storage systems may be utilized to protect such electronic content. Such large systems may be configured to provide auto-tiering services, wherein more frequently used data is moved to faster storage tiers and less frequently used data is moved to slower storage tiers.

SUMMARY OF DISCLOSURE

In one implementation, a computer-implemented method includes initiating a relocation process to move local data from an SMR-based storage tier within an auto-tiering data system to a different storage tier within the auto-tiering data system. The local data is located within one or more sectors of the SMR-based storage tier. The local data is copied from the SMR-based storage tier to the different storage tier. The one or more sectors of the SMR-based storage tier are unmapped.

One or more of the following features may be included. An operation may be performed that results in the overwriting of the one or more sectors of the SMR-based storage tier. Performing an operation that results in the overwriting of the one or more sectors of the SMR-based storage tier may include writing new data to the one or more sectors within the SMR-based storage tier. Performing an operation that results in the overwriting of the one or more sectors of the SMR-based storage tier may include writing new data proximate the one or more sectors within the SMR-based storage tier. Usage of the local data within the SMR-based storage tier may be monitored. A determination may be made concerning whether the local data should be moved from the SMR-based storage tier to the different storage tier. The different storage tier may include one of: a faster storage tier; and a slower storage tier.

In another implementation, a computer program product resides on a computer readable medium and has a plurality of instructions stored on it. When executed by a processor, the instructions cause the processor to perform operations including initiating a relocation process to move local data from an SMR-based storage tier within an auto-tiering data system to a different storage tier within the auto-tiering data system. The local data is located within one or more sectors of the SMR-based storage tier. The local data is copied from the SMR-based storage tier to the different storage tier. The one or more sectors of the SMR-based storage tier are unmapped.

One or more of the following features may be included. An operation may be performed that results in the overwriting of the one or more sectors of the SMR-based storage tier. Performing an operation that results in the overwriting of the one or more sectors of the SMR-based storage tier may include writing new data to the one or more sectors within the SMR-based storage tier. Performing an operation that results in the overwriting of the one or more sectors of the SMR-based storage tier may include writing new data proximate the one or more sectors within the SMR-based storage tier. Usage of the local data within the SMR-based storage tier may be monitored. A determination may be made concerning whether the local data should be moved from the SMR-based storage tier to the different storage tier. The different storage tier may include one of: a faster storage tier; and a slower storage tier.

In another implementation, a computing system including a processor and memory is configured to perform operations including initiating a relocation process to move local data from an SMR-based storage tier within an auto-tiering data system to a different storage tier within the auto-tiering data system. The local data is located within one or more sectors of the SMR-based storage tier. The local data is copied from the SMR-based storage tier to the different storage tier. The one or more sectors of the SMR-based storage tier are unmapped.

One or more of the following features may be included. An operation may be performed that results in the overwriting of the one or more sectors of the SMR-based storage tier. Performing an operation that results in the overwriting of the one or more sectors of the SMR-based storage tier may include writing new data to the one or more sectors within the SMR-based storage tier. Performing an operation that results in the overwriting of the one or more sectors of the SMR-based storage tier may include writing new data proximate the one or more sectors within the SMR-based storage tier. Usage of the local data within the SMR-based storage tier may be monitored. A determination may be made concerning whether the local data should be moved from the SMR-based storage tier to the different storage tier. The different storage tier may include one of: a faster storage tier; and a slower storage tier.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
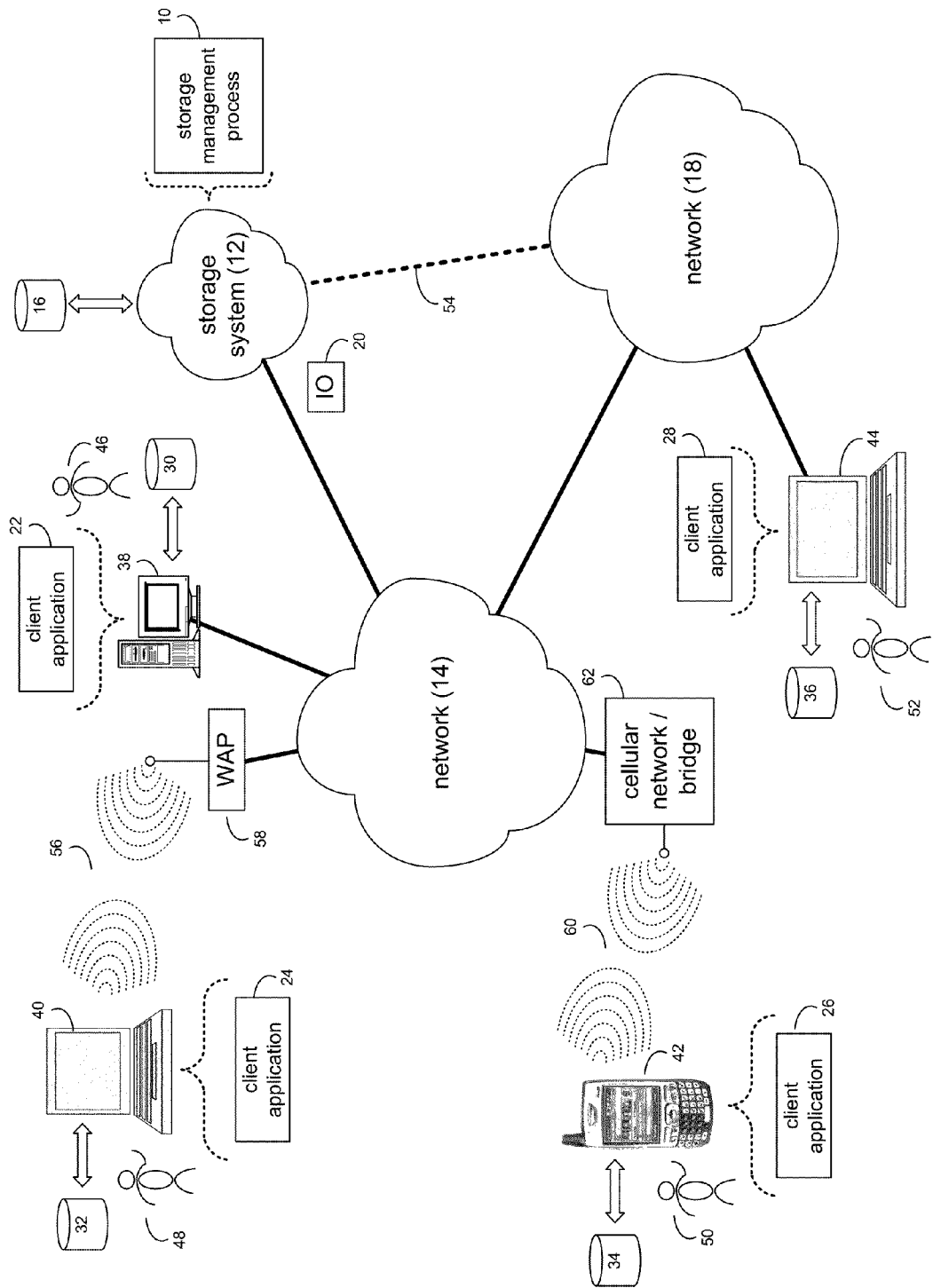
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to:

Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of solid state storage devices.

Network 14 may be connected to one or more secondary networks (e.g., network 18), examples of which may include but are not limited to: a local area network; a wide area network; a fibre channel network, a direct cable connection, or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of solid state storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure, such as the use of solid state storage devices, and the combination of electro-mechanical backend storage devices and solid state storage devices.

Figure 2:
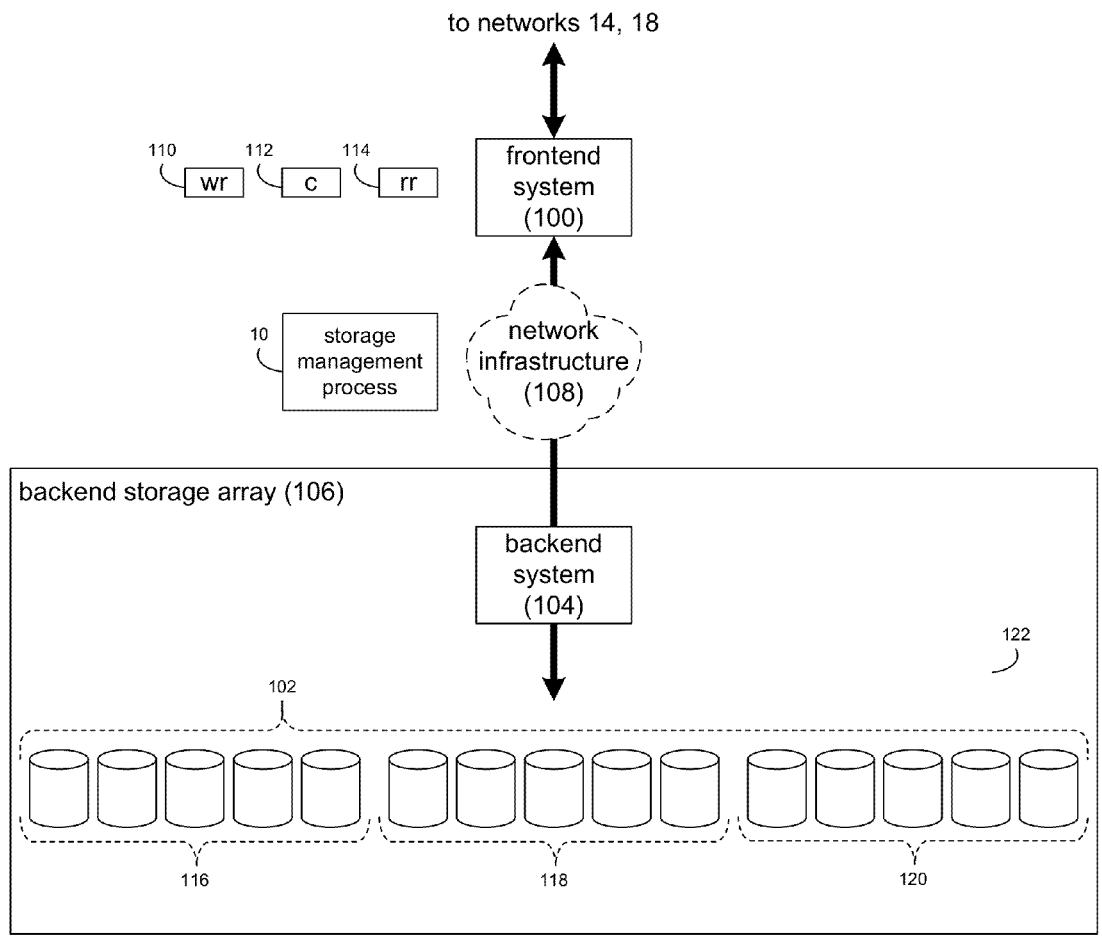
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is stripped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/Flash devices, wherein the combination of plurality of storage targets 102 and processing/control systems (e.g., backend system 104) may form backend storage array 106.

The manner in which storage system 12 is implemented may vary depending upon e.g. the level of redundancy/performance/capacity required. For example, storage system 12 may be a RAID device in which first frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which first frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. first frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first frontend system 100, may be executed by one or more processors (not shown) and one or more memory architectures (not shown) included within first frontend system 100. Storage device 16 may include but is not limited to: a hard disk drive; a tape drive; an optical drive; a RAID device; a random access memory (RAM); a read-only memory (ROM); and all forms of solid state storage devices.

As discussed above, various IO requests (e.g. IO request 20) may be generated. For example, these IO requests may be sent from client applications 22, 24, 26, 28 to storage system 12. Additionally/alternatively and when first frontend system 100 is configured as an application server, these IO requests may be internally generated within first frontend system 100. Examples of IO request 20 may include but are not limited to data write request 110 (i.e. a request that content 112 be written to storage system 12) and data read request 114 (i.e. a request that content 112 be read from storage system 12).

During operation of first frontend system 100, content 112 to be written to storage system 12 may be processed by first frontend system 100. Additionally/alternatively and when first frontend system 100 is configured as an application server, content 112 to be written to storage system 12 may be internally generated by first frontend system 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on first frontend system 100, some or all of the instruction sets and subroutines of storage management process 10 may be executed by one or more processors (not shown) and one or more memory architectures (not shown) included within backend system 104 of backend storage array 106.

Plurality of storage targets 102 may be divided into a plurality of storage tiers (e.g., storage tiers 116, 118, 120) within auto-tiering system 122, wherein each of these storage tiers may provide a different level of performance. For example, storage tier 116 within auto-tiering system 122 may utilize flash-based storage targets (and provide high-level performance); storage tier 118 within auto-tiering system 122 may utilize SAS-based storage targets (and provide mid-level performance) and storage tier 120 within auto-tiering system 122 may utilize NL/SAS-based storage targets (and provide low-level performance).

The Storage Management Process:

As discussed above, plurality of storage targets 102 may be divided into a plurality of storage tiers (e.g., storage tiers 116, 118, 120) within auto-tiering system 122, wherein each of these storage tiers (e.g., storage tiers 116, 118, 120) may provide a different level of performance. One such storage tier may include Shingled Magnetic Recording (SMR) disk drives.

As is known in the art, SMR disk drives are named after roof shingles, wherein relatively wide data tracks are written to the disk and successively written data tracks partially overlap the previously written data tracks (similar to the manner in which roof shingles are applied). A key component of increasing data density in disk drives is to utilize thinner data tracks that are packed more closely together. Writing thinner data tracks has typically required narrowing the width of the poles of the magnetic read/write head within the disk drive. When energized, a magnetic field emanating from this magnetic read/write head writes and erases data by flipping the magnetization of small regions (e.g., bits) on the spinning disk platter positioned below. Unfortunately, narrowing the poles of the magnetic read/write head may also reduce the strength of the magnetic field produced. One way to achieve a higher data-density benefit of narrower tracks without actually having to write to narrower tracks is to write relatively wide tracks that partially overlap the previous tracks. This is the technological basis of SMR disk drives, since (as discussed above) successively written data tracks overlap. Unfortunately, such a configuration requires special care to avoid corrupting good data in adjacent tracks when overwriting data that is no longer needed.

Figure 3:
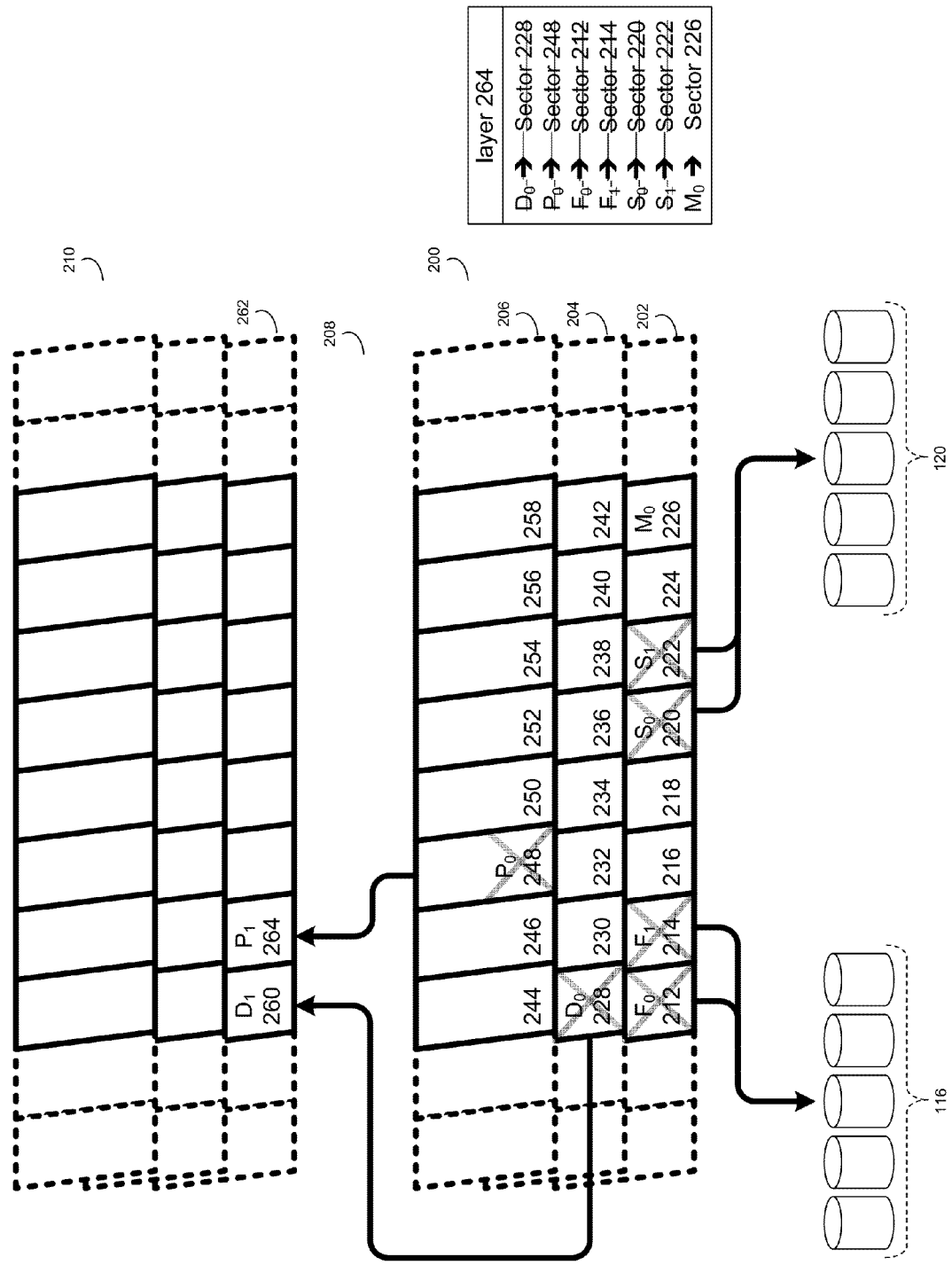
FIG. 3 is a diagrammatic view of an SMR-based disk drive.

Referring also to FIG. 3, there is shown SMR band 200 included within an SMR disk drive, wherein SMR band 200 includes three adjacent and partially overlapping tracks (e.g., SMR tracks 202, 204, 206). SMR bands may be separated by guard bands. For example, guard band 208 is shown to separate SMR band 200 from SMR band 210. Included within SMR tracks (e.g., SMR tracks 202, 204, 206) are sectors. For example: sectors 212, 214, 216, 218, 220, 222, 224, 226 are shown included within SMR track 202; sectors 228, 230, 232, 234, 236, 238, 240, 242 are shown included within SMR track 204; and sectors 244, 246, 248, 250, 252, 254, 256, 258, are shown included within SMR track 206.

Unfortunately and for the reasons discussed above, in the event that you write/overwrite data included within e.g., sector 228 of SMR track 204, the data included within sectors 212, 244 may be corrupted due to the manner in which these tracks overlap with sector 228. Accordingly, SMR disk drives may include a swap space into which data may be moved to allow for the writing/overwriting of data without adjacent data being corrupted. For example, SMR band 210 may be configured for use as such a swap space.

For example, assume that storage management process 10 would like to overwrite data (D0) included within sector 228 of SMR track 204 with updated data (D1). Accordingly, storage management process 10 may write updated data (D1) to e.g., sector 260 of SMR track 262. Once updated data (D1) is written to e.g., sector 260 of SMR track 262, storage management process 10 may initiate an unmap process with respect to sector 228 of SMR track 202. Specifically, SMR drives may use shingle translation layer 264 (e.g., a mapping layer) to map the location of data within the SMR disk drive. Accordingly and through the use of the above-described upmapping process, the data mapping (e.g., pointer) within shingle translation layer 264 that locates e.g., data within sector 228 of SMR track 204 may be removed (graphically illustrated as being struck-through), thus allowing for the overwriting of sector 228. Further, various other sectors (e.g., sector 248) within various other SMR tracks (e.g., SMR track 206) may be moved into SMR band 210 (which may be configured as a swap space). These moves may be reactive and in response to overwrite commands for writing new/updated data to e.g., sector 248. Alternatively, these moves may be proactive to e.g., effectuate the movement of the last remaining sectors of data from SMR band 200 to SMR band 210 to allow for the wholesale repurposing/overwriting of SMR band 200. This may be referred to as a "garbage collection" operation. For example, SMR band 200 may be utilized as a swap space once the remaining sectors of data from SMR band 200 have been moved.

Further, if SMR band 200 (in its entirety) were to be unmapped by storage management process 10, the SMR disk device may reinitiate the sequential writing of data in SMR band 200 directly without having to resort to parking sectors in swap space (e.g., SMR band 210), or by performing a read-modify-write merge. Specifically, an alternative to using swap space (e.g., SMR band 210) is to read the entire band, merge the new data into the band, and re-write the entire band (which is also very impactful to performance). This may also release the overwrites in the swap area (e.g., SMR band 210) associated with SMR band 200.

Assume for illustrative purposes that storage tier 118, which is configured to provide mid-level performance, is configured to utilize SMR-based storage targets. Further assume that SMR bands 300, 310 are both portions of an SMR disk drive included within SMR-based storage tier 118. Therefore, data that is currently residing in SMR-based storage tier 118 and becomes more active/more frequently used may be moved to storage tier 116 (which utilizes flash-based storage targets and provides high-level performance). Conversely, data that is currently residing in SMR-based storage tier 118 and becomes less active/less frequently used may be moved to storage tier 120 (which utilizes NL/SAS-based storage targets and provides low-level performance).

Figure 4:
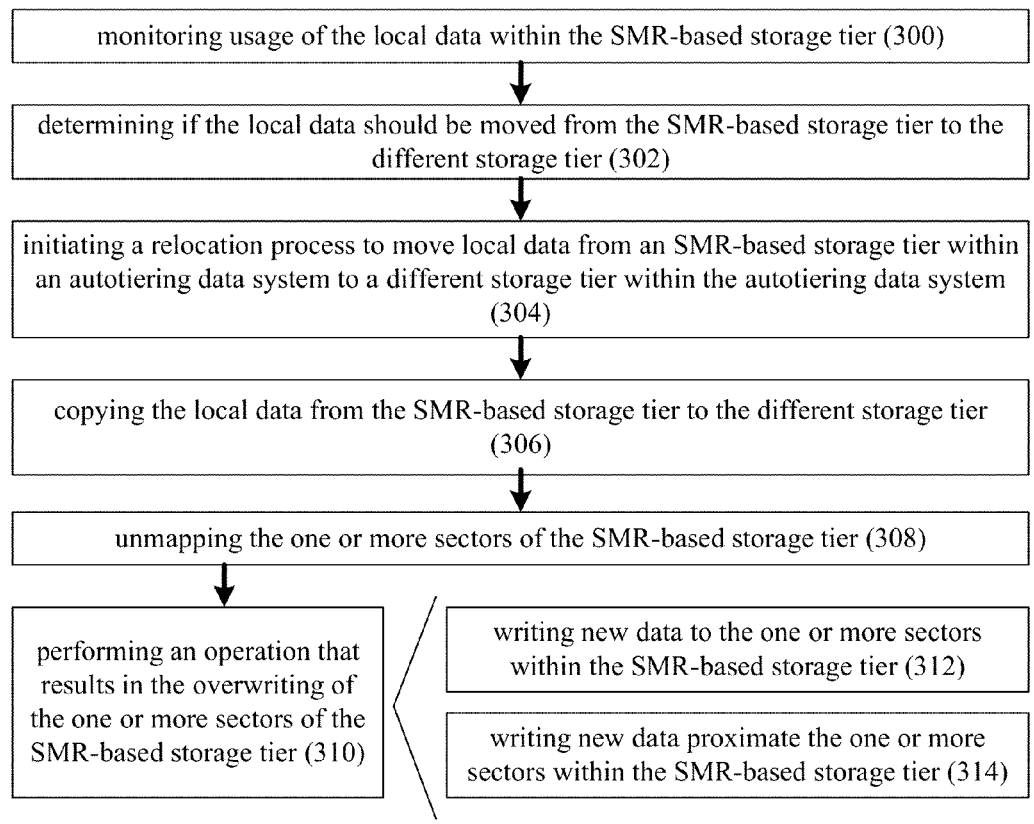
FIG. 4 is a flow chart of one implementation of the storage management process of FIG. 1.

Referring also to FIG. 4, storage management process 10 may monitor 300 usage of local data within SMR-based storage tier 118 to determine 302 if the local data should be moved from SMR-based storage tier 118 to a different storage tier. As discussed above, the different storage tiers may include faster storage tiers (e.g., storage tier 116) or slower storage tiers (e.g., storage tier 120).

Accordingly, assume that after monitoring 300 the usage of local data ($F_0, F_1$) included within sectors 212, 214 (respectively) of SMR-based storage tier 118, storage management process 10 determines 302 that local data ($F_0, F_1$) included within sectors 212, 214 (respectively) should be moved from SMR-based storage tier 118 to "faster" storage tier 116, as this data has become highly active.

Further, assume that after monitoring 300 the usage of local data ($S_0, S_1$) included within sectors 220, 222 (respectively) of SMR-based storage tier 118, storage management process 10 determines 302 that local data ($S_0, S_1$) included within sectors 220, 222 (respectively) should be moved from SMR-based storage tier 118 to "slower" storage tier 120, as this data has become highly inactive.

Accordingly, storage management process 10 may initiate 304 a relocation process to move local data (e.g., local data $F_0$, $F_1$, $S_0$, $S_1$ included within sectors 212, 214, 220, 222, respectively) from SMR-based storage tier 118 to different storage tiers within auto-tiering data system 122. Storage management process 10 may copy 306 the local data (e.g., local data $F_0$, $F_1$, $S_0$, $S_1$ included within sectors 212, 214, 220, 222, respectively) from SMR-based storage tier 118 to these different storage tier (namely "faster" storage tier 116 for local data $F_0$, $F_1$ included within sectors 212, 214; and "slower" storage tier 120 for local data $S_0$, $S_1$ included within sectors 220, 222).

Once copied 306, storage management process 10 may unmap 308 these sectors within SMR-based storage tier 118. Specifically, storage management process 10 may unmap 308 sectors 212, 214, 220, 222 within shingle translation layer 264, thus removing (graphically illustrated as being struck-through) the data mappings (e.g., pointers) within shingle translation layer 264 that locate e.g., data within sectors 212, 214, 220, 222, thus allowing for the overwriting of sectors 212, 214, 220, 222.

Once sectors 212, 214, 220, 222 are unmapped 308 by storage management process 10, storage management process 10 may perform 310 operations that may result in the overwriting of one or more of sectors 212, 214, 220, 222 of SMR-based storage tier 118. When performing 310 such operations, storage management process 10 may write 312 new data to one or more of sectors 212, 214, 220, 222 within SMR-based storage tier 118. Alternatively and when performing 310 such operations, storage management process 10 may write 314 new data proximate one or more of sectors 212, 214, 220, 222 within SMR-based storage tier 118.

As discussed above, due to the manner in which SMR-based disk drives are configured (specifically, the manner in which SMR tracks overlap), in the event that you write/overwrite data included within a sector of an SMR track, the data included within adjacent sectors may be corrupted due. Accordingly, once sectors 212, 214, 220, 222 are unmapped 308 by storage management process 10, operations may be performed 310 (such as writing 312 new data to one or more of sectors 212, 214, 220, 222 or writing 314 new data proximate one or more of sectors 212, 214, 220, 222) that may result in the loss/corruption of the data residing within sectors 212, 214, 220, 222, since this data was already moved to other storage tiers (e.g., storage tiers 316, 320) within auto-tiering system 122 and, therefore, this data is no longer needed. Accordingly, by un-mapping 308 sectors 212, 214, 220, 222 (graphically illustrated as being struck-through) within shingle translation layer 264, storage management process 10 may lessen the computationally-expensive use of the above-described swap space.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   initiating a relocation process to move local data from a Shingled Magnetic Recording (SMR)-based storage tier within an autotiering data system to a different storage tier within the autotiering data system, wherein the local data is located within one or more sectors of the SMR-based storage tier;
   copying the local data from the SMR-based storage tier to the different storage tier; and
   un-mapping the one or more sectors of the SMR-based storage by removing a data mapping that points to the local data within the one or more sectors of the SMR-based storage tier, wherein the data mapping is in a shingle translation layer on a swap space.

2. The computer-implemented method of claim 1 further comprising:
   performing an operation that results in the overwriting of the one or more sectors of the SMR-based storage tier.

3. The computer-implemented method of claim 1 wherein performing an operation that results in the overwriting of the one or more sectors of the SMR-based storage tier includes:
   writing new data to the one or more sectors within the SMR-based storage tier.

4. The computer-implemented method of claim 1 wherein performing an operation that results in the overwriting of the one or more sectors of the SMR-based storage tier includes:
   writing new data proximate the one or more sectors within the SMR-based storage tier.

5. The computer-implemented method of claim 1 further comprising:

monitoring usage of the local data within the SMR-based storage tier.

6. The computer-implemented method of claim 5 further comprising:
 determining if the local data should be moved from the SMR-based storage tier to the different storage tier.

7. The computer-implemented method of claim 1 wherein the different storage tier includes one of:
 a faster storage tier; and
 a slower storage tier.

8. A computer program product residing on a non-transitory computer readable medium having a plurality of instructions stored thereon which, when executed by a processor, cause the processor to perform operations comprising:
 initiating a relocation process to move local data from a Shingled Magnetic Recording (SMR)-based storage tier within an autotiering data system to a different storage tier within the autotiering data system, wherein the local data is located within one or more sectors of the SMR-based storage tier;
 copying the local data from the SMR-based storage tier to the different storage tier; and
 un-mapping the one or more sectors of the SMR-based storage tier by removing a data mapping that points to the local data within the one or more sectors of the SMR-based storage tier, wherein the data mapping is in a shingle translation layer on a swap space.

9. The computer program product of claim 8 further comprising instruction to perform operations including:
 performing an operation that results in the overwriting of the one or more sectors of the SMR-based storage tier.

10. The computer program product of claim 8 wherein performing an operation that results in the overwriting of the one or more sectors of the SMR-based storage tier includes:
 writing new data to the one or more sectors within the SMR-based storage tier.

11. The computer program product of claim 8 wherein performing an operation that results in the overwriting of the one or more sectors of the SMR-based storage tier includes:
 writing new data proximate the one or more sectors within the SMR-based storage tier.

12. The computer program product of claim 8 further comprising instruction to perform operations including:
 monitoring usage of the local data within the SMR-based storage tier.

13. The computer program product of claim 12 further comprising instruction to perform operations including:
 determining if the local data should be moved from the SMR-based storage tier to the different storage tier.

14. The computer program product of claim 8 wherein the different storage tier includes one of:
 a faster storage tier; and
 a slower storage tier.

15. A computing system including a processor and memory configured to perform operations comprising:
 initiating a relocation process to move local data from a Shingled Magnetic Recording (SMR)-based storage tier within an autotiering data system to a different storage tier within the autotiering data system, wherein the local data is located within one or more sectors of the SMR-based storage tier;
 copying the local data from the SMR-based storage tier to the different storage tier; and
 un-mapping the one or more sectors of the SMR-based storage tier by removing a data mapping that points to the local data within the one or more sectors of the SMR-based storage tier, wherein the data mapping is in a shingle translation layer on a swap space.

16. The computing system of claim 15 further configured to perform operations comprising:
 performing an operation that results in the overwriting of the one or more sectors of the SMR-based storage tier.

17. The computing system of claim 15 wherein performing an operation that results in the overwriting of the one or more sectors of the SMR-based storage tier includes:
 writing new data to the one or more sectors within the SMR-based storage tier.

18. The computing system of claim 15 wherein performing an operation that results in the overwriting of the one or more sectors of the SMR-based storage tier includes:
 writing new data proximate the one or more sectors within the SMR-based storage tier.

19. The computing system of claim 15 further configured to perform operations comprising:
 monitoring usage of the local data within the SMR-based storage tier.

20. The computing system of claim 19 further configured to perform operations comprising:
 determining if the local data should be moved from the SMR-based storage tier to the different storage tier.

* * * * *